INVENTORS
RUSSELL A. ROWLEY
FRANCIS V. ADAMS
JOHN F. GAFFNEY

BY Albert R. Hodges

ATTORNEY

Feb. 13, 1962 R. A. ROWLEY ET AL 3,021,069
STATISTICAL ANALYZING SYSTEM
Filed Nov. 2, 1956 13 Sheets-Sheet 12

United States Patent Office 3,021,069
Patented Feb. 13, 1962

3,021,069
STATISTICAL ANALYZING SYSTEM
Russell A. Rowley, Binghamton, and Francis V. Adams and John F. Gaffney, Endicott, N.Y., assignors to International Business Machines Corporation, New York, N.Y., a corporation of New York
Filed Nov. 2, 1956, Ser. No. 620,148
6 Claims. (Cl. 235—168)

This invention relates to a statistical analyzing system which is adapted to analyze a sequence of input signals, and more particularly to an arrangement for providing quantitative information regarding an input sequence.

A principal object of the present invention is to provide a statistical analyzing system which analyzes a sequence of input signals and furnishes quantitative information concerning the sequence.

Another object is to provide a system which furnishes output data immediately after receipt of an input sequence.

An additional object of the present invention is to provide an indication whenever a predetermined threshold is exceeded.

An important feature of the present invention is that it generates, from a sequence of input signals, counts and sums which may be used to describe the statistical nature of the sequence. In particular, sums may be generated which will indicate statistically the degree of "roughness" or "non-randomness" of an input sequence. An additional feature is the provision of means for choosing, from a number of sequences, ones having a specified degree of non-randomness, this being accomplished by the setting of a "threshold" such that only the sums associated with the desired sequences have sufficiently high values to exceed this threshold.

Other objects and features of the present invention will be pointed out in the following description and claims and illustrated in the accompanying drawings, which disclose, by way of example, the principle of the invention and the best mode, which has been contemplated, of applying that principle.

In the drawings, in which like reference numerals designate like components.

THE SYSTEM AS A WHOLE

Figure 1:
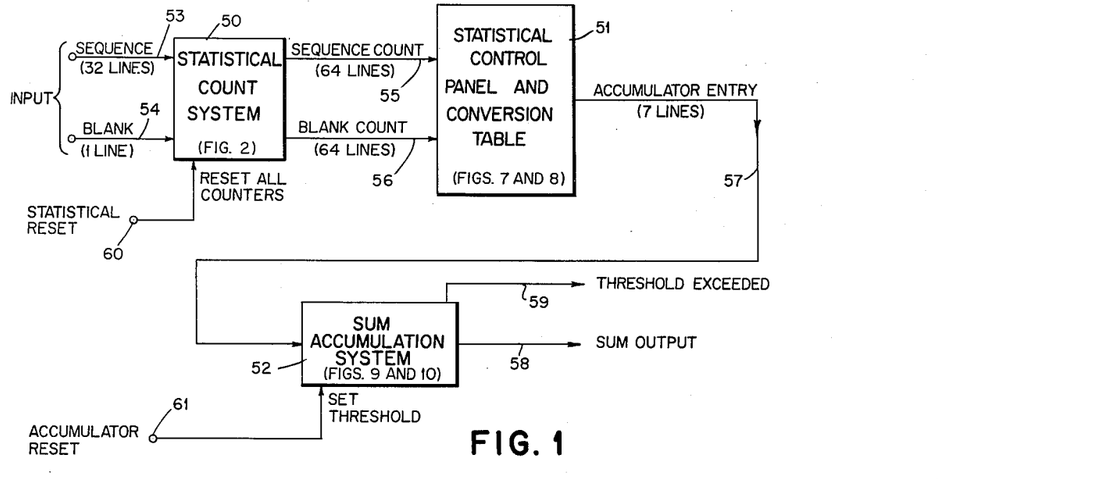
FIG. 1 is a basic block diagram of a statistical analyzing system in accordance with the present invention.

As shown in FIG. 1 of the drawings, the system as a whole comprises three principal subsidiary systems. The first system, represented by box 50, is the statistical count system. The statistical control panel and conversion table comprise the second subsidiary system, being together represented by box 51. The third unit of the system as a whole comprises sum accumulation system 52.

Information is presented to the system as a whole by means of positive-going voltage pulse signals on 32 sequence input lines comprising a cable 53. Another input is provided by blank input line 54, the purpose of which will be described later. The sequence input signals are mutually exclusive, that is, a signal pulse may appear on only one line at one time. The sequence in which the input lines are signalled constitutes the sequence to be statistically described. A signal on a given line may be thought of as representing the occurrence of an event associated uniquely with that line, and a sequence of signals as representing a sequence of mutually exclusive events, each uniquely described by association with a particular sequence input line.

The output of statistical count system 50 comprises a cable 55 of 64 sequence count lines, and a cable 56 of 64 blank count lines. Cables 55 and 56 serve as the input to statistical control panel and conversion table unit 51. Statistical count system 50 counts the signals appearing on each input line and, whenever an input line is signalled, generates a positive-going voltage pulse on one of the numbered sequence count lines comprising cable 55, in such a manner that the number of the pulsed output line corresponds to the total count of signals on the input line being signalled.

By suitable control panel wiring, together with appropriate use of the conversion table of unit 51, a pulse on a given numbered output line of cable 55 may be made to cause any chosen number, not necessarily that of the line, to be developed in a seven-line cable 57 and supplied to sum accumulation system 52. In this manner the accumulator system may be made to generate sums whose value, when normalized with respect to the length of the input sequence and the number of input lines required to describe the sequence, will vary depending upon the relative frequency of occurrence of signals on the input lines. The normalized value of the sum may therefore statistically describe the non-randomness of the input sequence.

As an example, consider a sequence of N signals or events, appearing on K input lines. Let it be supposed that the control panel of unit 51 is wired in such a manner that on the first occurrence of a signal on a given line of cable 55, zero is added to the accumulator; on the second occurrence, one; on the third occurrence, two; and so forth. Then a sum will be generated of the form $$\sum_{i=1}^{K} \frac{f_i(f_i-1)}{2}$$

where $i(=1, 2, 3, \ldots K)$ identifies a particular input line, and $f_i$ is the number of signals in the sequence appearing on that line. The normalized value of the sum is given by $$\frac{2K}{N(N-K)} \sum_{i=1}^{K} \frac{f_i(f_i-1)}{2}$$

Normalized values increasingly greater than one indicate increasing "roughness" or non-randomness in the sequence.

In accordance with an important feature of the present invention, sequences having a specified degree of non-randomness may be chosen from a number of sequences, all with the same values of N and K, by generating for each sequence a sum such as $$\sum_{i=1}^{K} \frac{f_i(f_i-1)}{2}$$

and setting a threshold in the accumulator such that only sums associated with the desired sequences have high enough values to pass the threshold. For this purpose, blank input line 54 is used to provide for the correction of sums with partially blank sequences. That is, this line may be signalled if blanks, or conditions of no signal, occur in the normal input sequence, and numbers based on the count of blanks may, through separate blank count output lines comprising cable 56 and suitable control panel wiring in panel 51, be added to the sum in accumulator system 52 to decrease the likelihood of an otherwise nonrandom sequence failing to reach the threshold because of blanks in the sequence.

The resulting sums in accumulator system 52, or the excess over threshold of such sums, may be read out of the accumulator in output cable 58 and recorded by suitable means (not shown). A separate indication that the threshold is exceeded is provided by a signal appearing on output line 59. Provision is made for resetting all the counters of statistical count system 50 by the application of a suitable reset signal to a terminal 60, and for resetting sum accumulation system 52 by the application of a suitable reset signal to a terminal 61.

STATISTICAL COUNT SYSTEM

General

Figure 2:
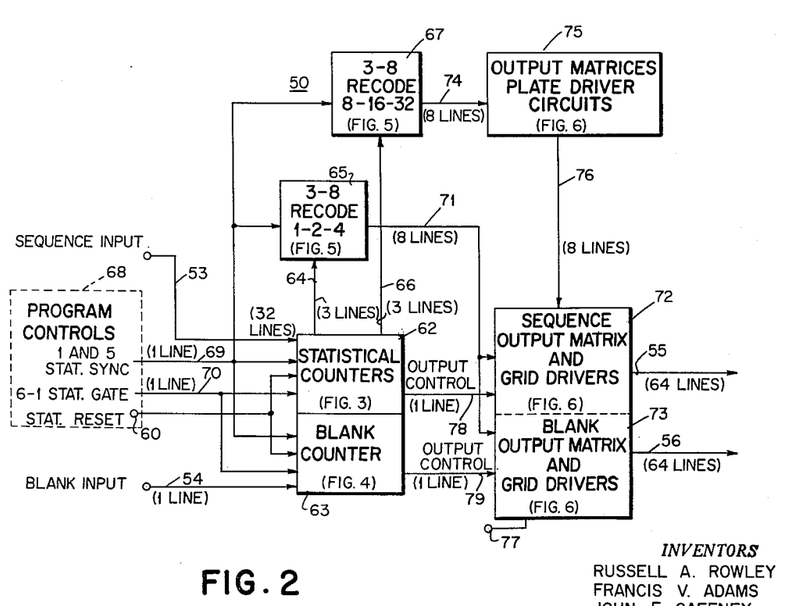
FIG. 2 is a block diagram of the statistical count system comprising a portion of the basic system of FIG. 1.

The statistical count system 50, shown in block form in FIG. 2 of the drawings, includes a statistical counter unit 62 comprising 32 binary counters, and a blank counter unit 63 consisting of a single binary counter. The 32 lines of sequence input cable 53 serve respectively as the inputs for the 32 counters of unit 62. The input of the single counter of unit 63 is blank input line 54.

The 1–2–4 output lines of units 62 and 63 comprise a cable 64, which serves as the input of a recode unit 65. Similarly, the 8–16–32 output lines of units 62 and 63, comprising a cable 66, provide the input for a recode unit 67. Suitable control signals, developed in a program control unit 68, are supplied by lines 69 and 70 to units 62, 63, 65 and 67. Additionally, statistical reset pulses applied to terminal 60 are supplied to counter units 62 and 63.

The eight-line output cable 71 of recode unit 65 serves as one of the inputs of sequence output matrix and grid driver unit 72 and of blank output matrix and grid driver unit 73. Output cable 74 of recode unit 67 comprises eight lines and serves as the input of output matrices plate driver circuit unit 75. The eight-line output cable 76 of the latter unit serves as the second input of units 72 and 73. The output of unit 72 comprises 64-line cable 55, and the output of unit 73 comprises 64-line cable 56. A suitable chop signal, developed at a terminal 77, is applied to units 72 and 73. Single-line output control cables 78 and 79 are connected respectively between statistical counter unit 62 and unit 72, and between blank counter unit 63 and unit 73.

A signal presented on one of the sequence input lines comprising cable 53 will cause the corresponding statistical counter of unit 62 to develop a binary number in output cables 64 and 66 corresponding to the number of times this counter had previously been signalled after being reset by the application of a statistical reset signal to terminal 60. Units 65, 67, 75 and 72 operate to translate this binary-coded output number of the counter of unit 62 into decimal form, so that the correspondingly numbered line of output cable 55 is energized. The application of a blank output signal to blank input line 54 causes a similar operation of blank counter unit 63, with the development of an output signal on the appropriate one of the 64 lines comprising blank output cable 56. The chop signal applied to terminal 77 is utilized to insure that well-formed output signals are developed respectively in cables 55 and 56.

Statistical counters and output control

Statistical counter unit 62 of FIG. 2 comprises 32 statistical counters. Each counter receives its input from one of the lines of sequence input cable 53, and presents the total count it contains to recode units 65 and 67 before adding a new count. The reason for thus reading the count out of the counter before adding the new count is to increase the range of the counter. The condition of the counter with all the triggers Off will be read before the first count is added into the counter. This condition will cause the output circuits to emit a signal on the first line of cable 55. When the counter with all the triggers On is read, the output circuits will cause a signal to be emitted on the 64th line of cable 55. In this manner, a full count of 64 is obtained instead of 63.

Figure 3:
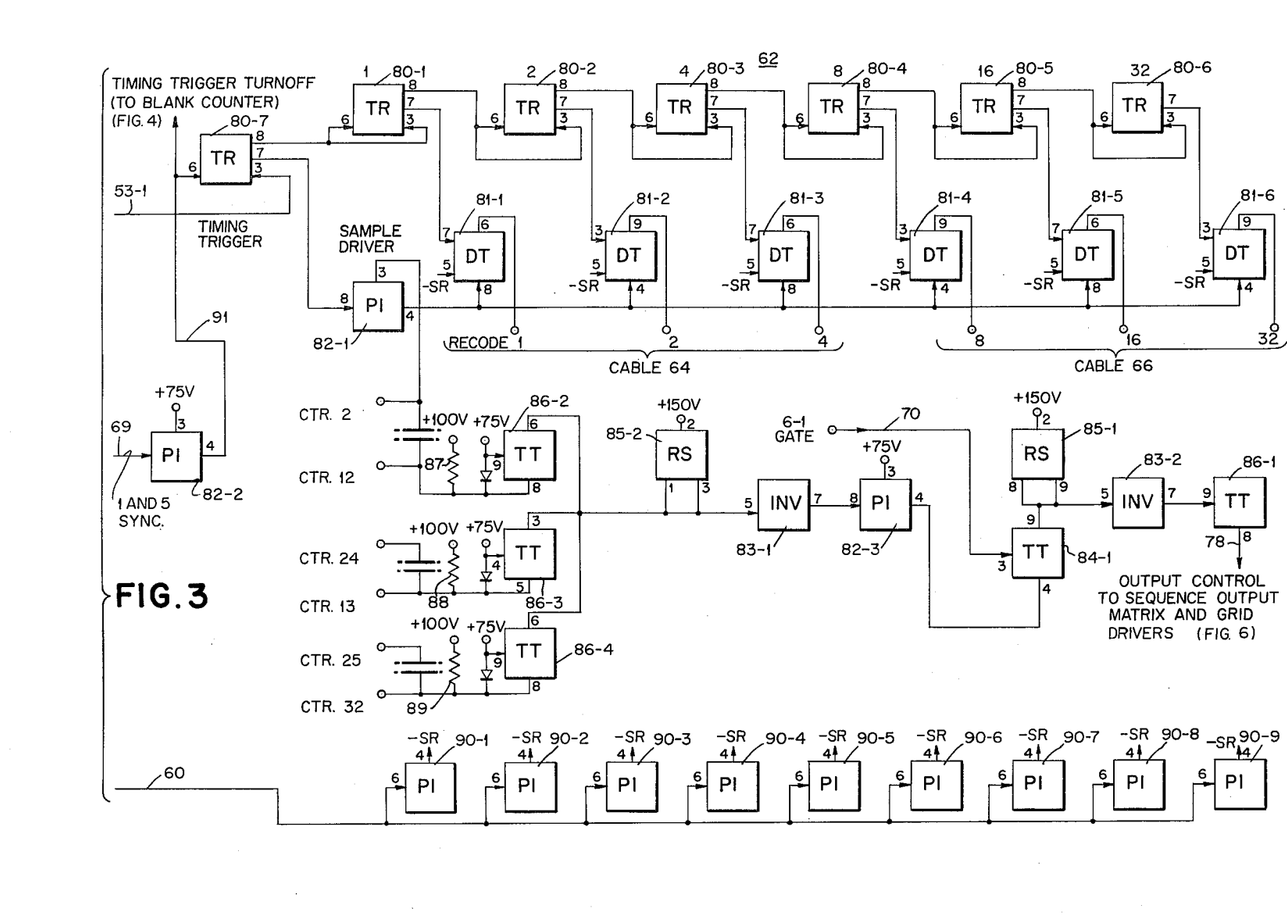
FIG. 3 is a block diagram of the statistical count portion of the system of FIG. 2.

The first of the 32 statistical counters of unit 62 is shown in detail in FIG. 3 of the drawings. This counter comprises six triggers, designated 80–1 through 80–6, arranged as a conventional binary counter. A trigger 80–7 serves as a timing trigger. Sample units 81–1 through 81–6 are associated respectively with counter triggers 80–1 through 80–6. The input signal developed on input line 53–1 is a positive-going signal extending from 6-bit to 5-bit time. The trailing edge of this input signal turns timing trigger 80–7 On. While timing trigger 80–7 is On, a signal will be sent to a sample driver unit 82–1, the output of which in turn is supplied to sample units 81–1 through 81–6, causing them to allow the signals presented to them by associated triggers 80–1 through 80–6 to be placed on the signal lines comprising respectively cables 64 and 66. These signal lines are common to all 32 counters.

Figure 5:
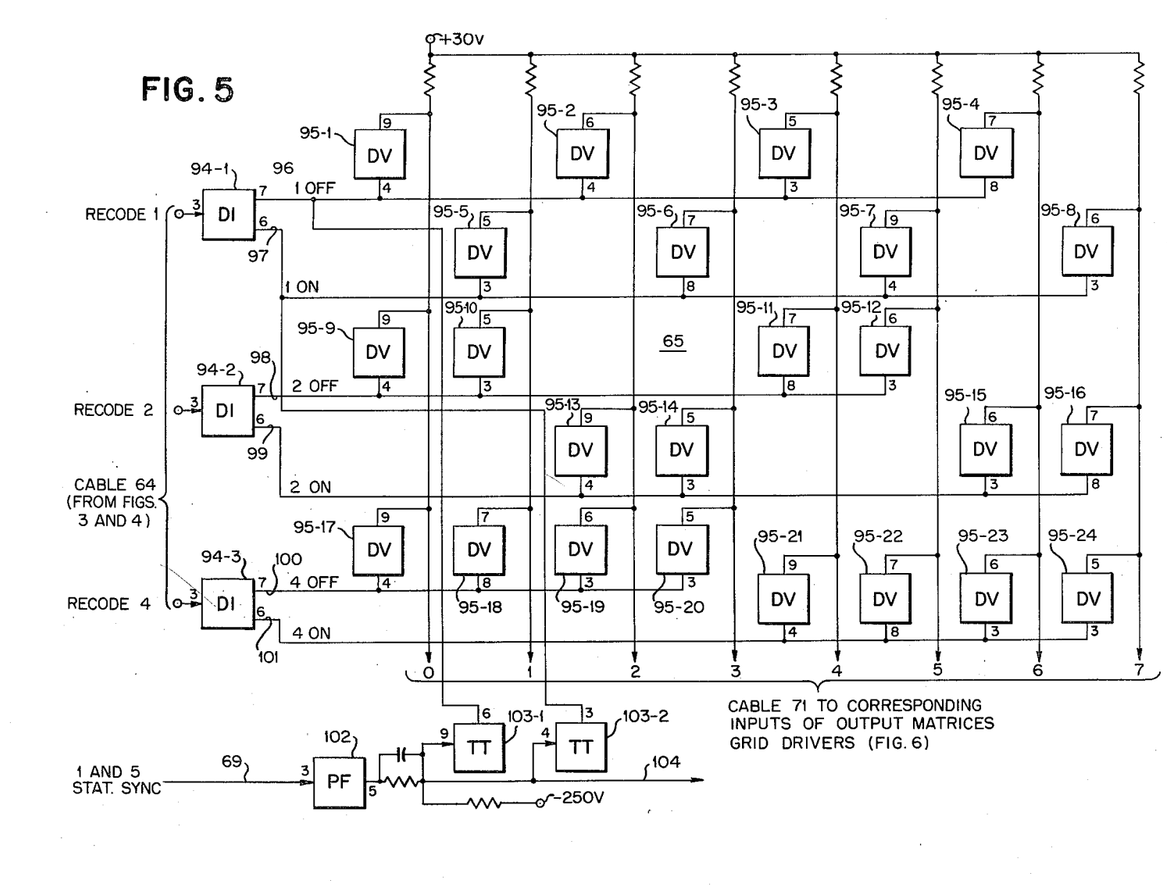
FIG. 5 is a block diagram of one of the recode matrix units of FIG. 2.

Synchronizing signals at 1-bit and 5-bit time as developed on line 69 by program control unit 68 (FIG. 2) are passed through a power inverter unit 82–2 and supplied by line 91 to timing trigger 80–7. When timing trigger 80–7 is turned Off by a timing trigger turn-off signal from power inverter unit 82–2 at 1-bit time, sample units 81–1 through 81–6 will prevent any further output of the triggers from reaching recode units 65 and 67 (FIG. 5). Thus the count in a statistical counter is available to the recode units from 5-bit to 1-bit time. When timing trigger 80–7 is turned Off at 1-bit time, it sends a signal to counter trigger 80–1, thus causing the counter to add a count.

Figure 4:
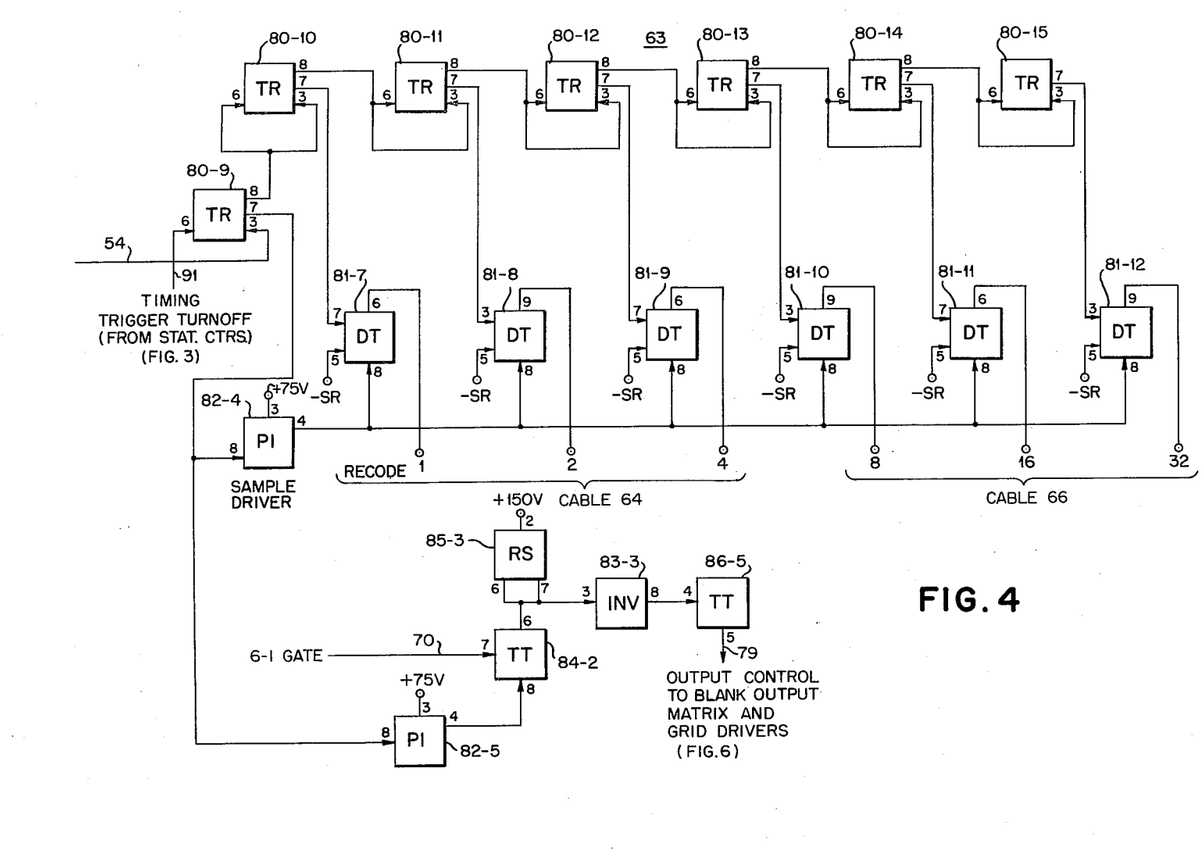
FIG. 4 is a block diagram of the blank counter portion of the system of FIG. 2.

The fact that the 5-bit synchronizing pulse is also applied through power inverter unit 82–2 to timing trigger 80–7 does not affect the operation of the latter unit, because the inherent circuit delay causes the trailing edge of the input signal to occur after this 5-bit synchronizing pulse has passed. Accordingly, the timing trigger is turned On by the trailing edge of the input signal. If by chance a 5-bit synchronizing pulse and the signal resulting from the trailing edge of the input signal should occur simultaneously, timing trigger 80–7 will operate in binary. Since the timing trigger had been Off as a result of the preceding timing trigger turn-off pulse at 1-bit time, the binary operation will cause it to turn On. It will be understood that the timing trigger turn-off signals are presented on line 91 to the timing triggers associated with all 32 statistical counters by power inverter unit 82–2, and also to blank counter unit 63 (FIG. 4).

Figure 6:
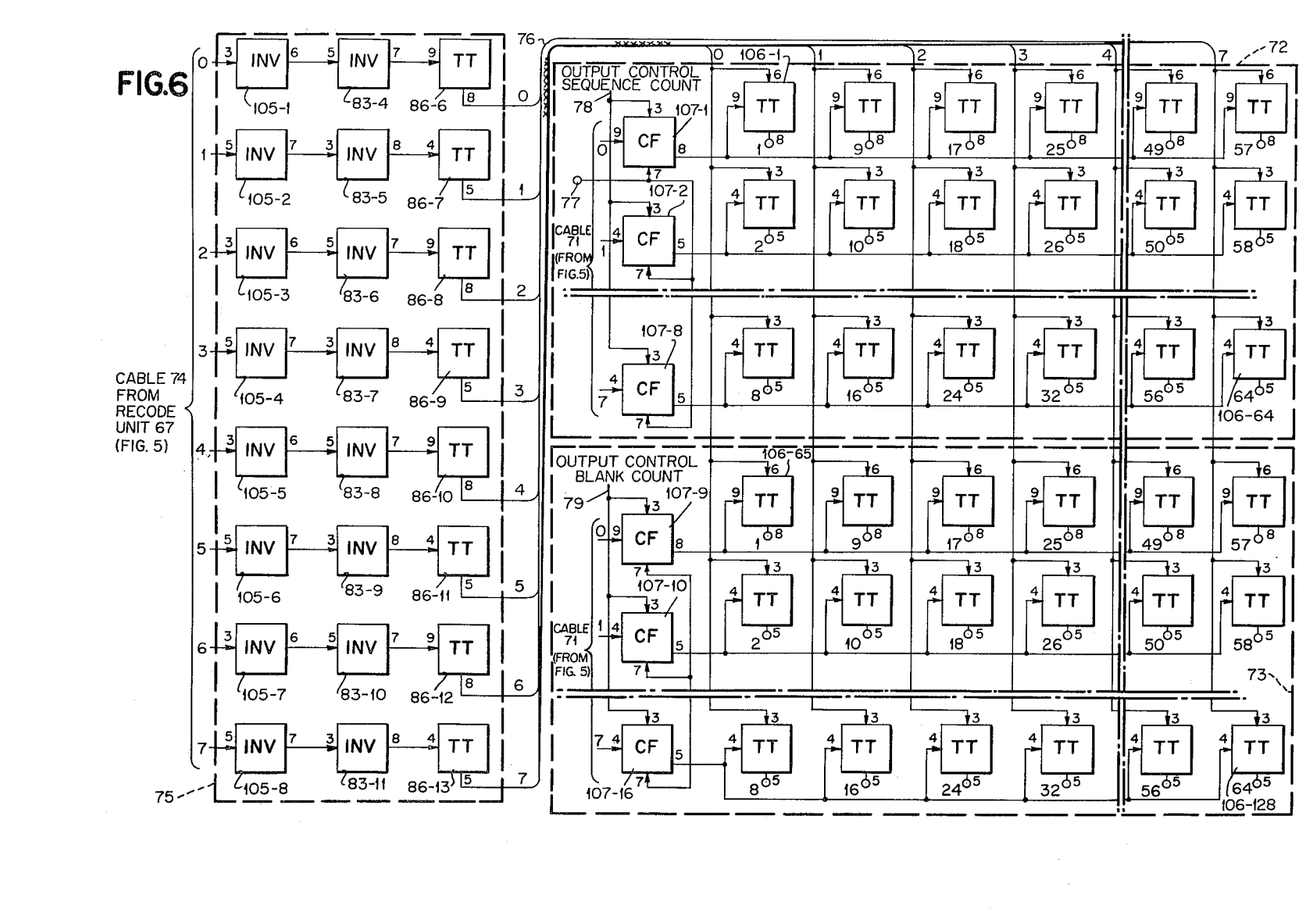
FIG. 6 is a block diagram of the output matrices and driver portions of FIG. 2.

An output control signal consisting of a pulse extending from 6-bit to 1-bit time is generated from a second output of sample driver unit 82–1, and is used to control the grid drivers in sequence output matrix and grid driver unit 72 (FIG. 6). This signal is generated by mixing the signals from all 32 sample drivers, then inverting the resultant signal in an inverter unit 83–1, passing the signal through a power inverter 82–3, and using the result to control the cathode of a switching unit 84–1. The grid of this switch is controlled by a 6-bit to 1-bit gate supplied on line 70 from program control unit 68 (FIG. 2). Unit 85–1 comprises the load for switching unit 84–1. While this 6–1 bit signal and the signal from the mixer enable switching unit 84–1, a signal will be sent through an inverter unit 83–2 to a cathode follower unit 86–1, which is connected to its cathode load in unit 72 (FIG. 6) by line 78. This signal will allow unit 72 to provide an output signal after an input has been presented to one of the 32 statistical counters.

The 32 sample drivers are divided into three groups (82–1 through 82–12, 82–13 through 82–24 and 82–25 through 82–32) with the sample drivers of each group sharing a common load resistor. These resistors are respectively designated 87, 88 and 89. This causes the output of each group to be mixed. The mixed output of the three groups of sample drivers is presented to a mixer composed of three triode units 86–2, 86–3 and 86–4 which share a common load resistor in unit 85–2. Thus wheinever a sample driver enables the sample units of its statistical counter, it will also send a signal through the mixer to switching unit 84–1. While this signal is present the 6–1 gate signal also presented to the switch will be able to pass through the switch and through inverter unit 83–2 to switch unit 86–1. The latter switch controls the plate power to the grid drivers in sequence output matrix and grid driver unit 72 (FIG. 6), and thus an output control signal is effectively provided on line 78.

The triggers of the statistical counters are reset to their Off condition by a statistical reset signal supplied to terminal 60 by program control unit 68 (FIG. 2). This statistical reset signal is inverted by a number of power inverter units 90–1 through 90–9, each of which supplies a group of triggers with an inverted reset signal. The inverted reset signal passes through an isolation diode in each sample unit 81 before being used to reset the associated trigger by plate pull-over.

*Blank counter*

Blank counter unit 63 comprises a single binary counter which is similar both in arrangement and mode of operation to any one of the statistical counters of unit 62. The blank counter unit is shown in detail in FIG. 4. Input signals are supplied on line 54 to a timing trigger 80–9, which is also supplied with 1-bit and 5-bit synchronizing pulses on line 91 (also in FIG. 3). The counter itself comprises triggers 80–10 through 80–15 connected to form a conventional binary counter. Sample units 81–7 through 81–12 are associated respectively with counter triggers 80–10 through 80–15. These sample units are under the control of a sample driver 82–4, and permit output signals to be developed on the six lines making up cables 64 and 66.

In addition to being supplied to sample driver unit 82–4, the output of timing trigger 80–9 is supplied through a power inverter 82–5 to a switching unit 84–2. By means of line 70 a 6–1 bit gate is also supplied to this switching unit, the load of which is represented by unit 85–3. The resultant output signal from switching unit 84–2 is passed through an inverter unit 83–3 to a cathode follower unit 86–5, which is connected to its cathode load in unit 73 (FIG. 6) by line 79. In this manner, an output control signal is effectively provided on line 79, in the same way that an output control signal is provided on line 78 of FIG. 3.

The triggers of the blank counter are reset to their Off condition by an inverted reset signal furnished by a number of power inverter units 90–1 through 90–9 (FIG. 3). The inverted reset signal passes through an isolating diode in each sample unit 81 before being used to reset the associated trigger by plate pull-over.

*The recode matrix units*

Recode matrix units 65 and 67 of FIG. 2 are identical except for the information they use. They accept a three-place binary number and translate it into the octal number equivalent. The 1, 2 and 4 lines comprising cable 64 serve as the input to recode unit 65, and the 8, 16 and 32 lines forming cable 66 supply input signals to recode unit 67. After translation into the octal system, the binary information supplied to recode units 65 and 67 is developed respectively on eight-line cables 71 and 74. Cable 71 furnishes the information in octal form to the grid drivers of units 72 and 73, and the information in cable 74 is passed through plate driver unit 75 before it is supplied to units 72 and 73.

FIG. 5 of the drawings shows recode matrix unit 65 in detail. The three input lines comprising cable 64 serve respectively as the inputs to double inverter units 94–1, 94–2 and 94–3. These units convert the input information into bi-polar form. That is, one output line is Up and the other output line is Down if the input binary line carries a one. If the binary line carries a zero, the two output lines will reverse their condition. The six output lines, respectively designated 96 through 101, two for each of units 94–1 through 94–3, are connected as shown to a triple coincidence diode switching arrangement comprising units 95–1 through 95–24. The output of this matrix comprises the eight lines forming cable 71. An output signal is developed on that one of the eight output lines which is connected through the diode units to three of lines 92–101 which are Up. In this manner, information in binary form appearing in three-line cable 64 is translated into the octal form, so that it is now represented as a signal on one, and only one, of the eight output lines comprising cable 71.

Statistical synchronizing pulses at 1-bit and 5-bit time, as developed on line 69 by program control unit 68 (FIG. 2), are supplied through a pulse-forming unit 102 and individual twin triode units 103–1 and 103–2 to output lines 96 and 97 of unit 94–1 associated with the 1 input line, for the purpose of chopping the output of the recode unit and thus improving the waveform of the output signal. Recode unit 67, which is identical with recode unit 65, is also supplied with chopping signals by means of a line 104. These chopping signals are applied to the two output lines of the unit 94 associated with the 8 input line. It will be understood, of course, that the input to unit 67 comprises the 8, 16 and 32 lines of cable 66 rather than the 1, 2 and 4 lines of cable 64, and that the output of unit 67 comprises the eight lines of cable 74 rather than the eight lines of cable 71.

*Output matrices and driver circuits*

The purpose of output matrices plate driver unit 75 is to raise the level of the output of recode unit 67 sufficiently to permit its use for controlling the plates of the output matrices. As shown in detail in FIG. 6 of the drawings, unit 75 comprises eight inverter units 105–1 through 105–8, eight inverter units 83–4 through 83–11, and eight switching units 86–6 through 86–13. The input to unit 75 comprises the eight lines of cable 74. Each of these lines has associated with it two inverter units connected in cascade and feeding a single switching unit, as shown. The output of unit 75 is developed on the eight lines comprising cable 76.

The output matrices comprise a total of 128 switching units arranged in eight columns and 16 rows. The plate terminals of all the switching units in each column are connected to one of the lines of cable 76. The upper eight rows of the switching units, respectively designated 106–1 through 106–64, comprise sequence output matrix unit 72. Cathode follower units 107–1 through 107–8 are associated respectively with the grid terminals of the switching units in the upper eight rows. The eight lines of cable 71 connect respectively to the input terminals of cathode follower units 107–1 through 107–8. The No. 3 terminals of these units are connected together and to sequence output control line 78. The output terminals of the 64 switching units comprising this matrix are connected respectively to the 64 lines of cable 55.

The lower eight rows of switching units, designated 106–65 through 106–128, comprise blank output matrix 73. Cathode follower units 107–9 through 107–16 are associated respectively with the eight rows of switching units comprising this matrix. The input terminals of these cathode follower units are connected respectively to the eight lines comprising cable 71. Blank output control line 79 is connected to the No. 3 terminal of each of these cathode follower units. The output terminals of switching units 106–65 through 106–128 are connected respectively to the 64 lines of cable 56.

Output matrices 72 and 73 distribute the output signals from counter units 62 and 63 to the correct line in cables 55 and 56. This is accomplished by using the signals from recode unit 67, after passing them through unit 75, to energize the plates of the switching units in one column of both of the matrices. The signal from recode unit 65 is utilized to enable one of the eight cathode follower units 107 in each of units 72 and 73. The particular one of these two cathode follower units which will be able in turn to enable a row of switch grids in the matrices is determined by which of output control lines 78 and 79 is carrying a signal. Since only one of these signals is present at a time, only one of the two groups of cathode follower units will be enabled. Of the enabled group, the particular cathode follower unit which becomes active to enable the row of switch grids in the matrix is determined by the output signal developed by recode unit 65. The switching unit at the intersection of an enabled grid and an enabled plate will be able to emit an output signal on the corresponding line of cable 55 or cable 56, provided this line is connected to a suitable cathode load in statistical control panel and conversion table 51.

Chop signals at 3-bit and 5-bit time are applied to terminal 77 and supplied to cathode follower units 107–1 through 107–16. These chop signals serve to improve the shape of the output signals developed on one of the lines comprising cables 55 and 56.

CONTROL PANEL AND CONVERSION TABLE

The statistical control panel and conversion table unit 51 of FIG. 1 serves as a connecting link between statistical count system 50 and sum accumulation system 52. The statistical control panel portion of unit 51 is shown in FIG. 7, and the conversion table portion in FIG. 8.

Figure 7:
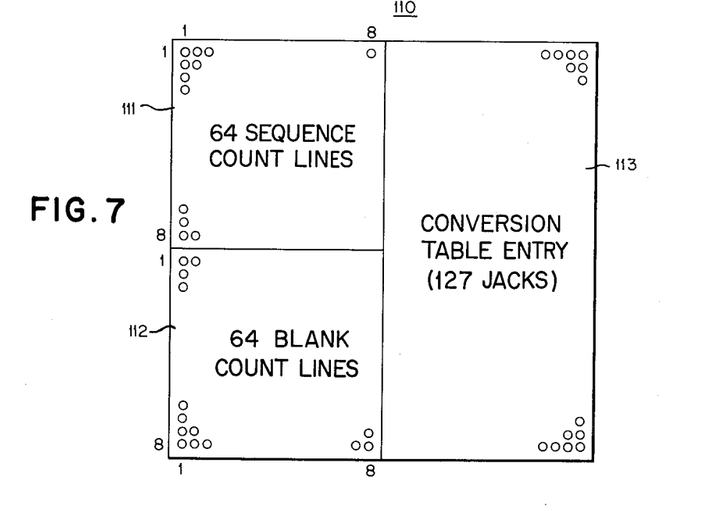
FIG. 7 shows the statistical control panel comprising a portion of the basic system of FIG. 1.

Referring first to FIG. 7, the statistical control panel, generally designated by the reference numeral 110, comprises three separate groups of jacks. The first group or portion 111 comprises 64 jacks which are connected respectively to the 64 sequence count output lines comprising cable 55. The second group, designated 112, comprises 64 jacks connected respectively to the 64 blank count output lines of cable 56. Portion 113 of control panel 110 is made up of 127 jacks, these jacks being connected respectively to the 127 input terminals of the conversion table of FIG. 8. By means of plug wires, any one of the 64 sequence count lines may be connected to any desired one of the 127 inputs to the conversion table. In a similar manner, a plug connection may be made between any of the 64 blank count lines and the 127 jacks of portion 113 of the statistical control panel. It will be apparent, therefore, that means are thus provided for assigning a numerical weight value to each of the sequence count output lines and to each of the 64 blank count output lines. It will also be readily apparent that this assigned weight value need not necessarily correspond with the number of the sequence count output line or of the blank count output line under consideration. The provision of this arrangement comprises an important feature of the present invention.

Figure 8:
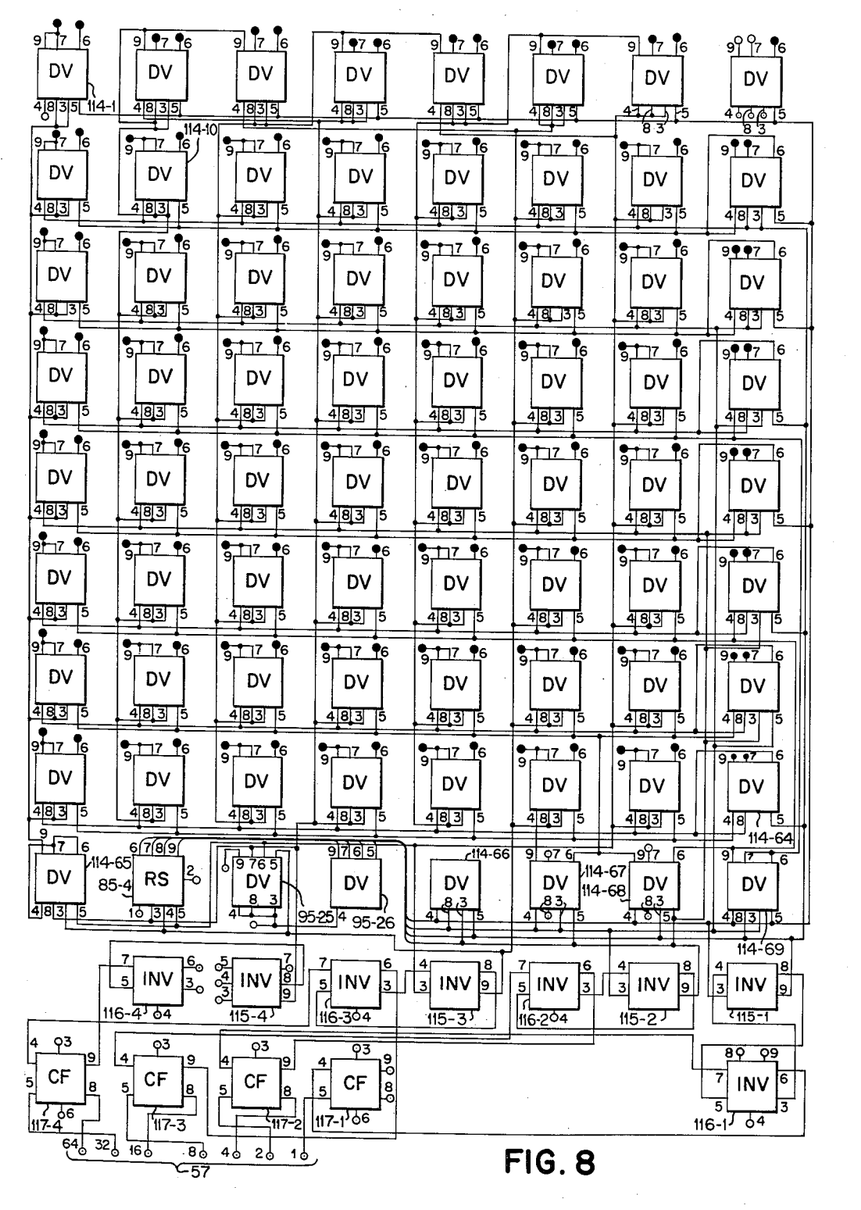
FIG. 8 is a block diagram of the conversion table portion of the basic system of FIG. 1.

Turning now to FIG. 8 of the drawings, there is shown in block form a diagram of the conversion table forming a portion of the statistical control panel and conversion table unit 51 (FIG. 1). As shown in FIG. 8, the conversion table is a diode matrix having 127 inputs, indicated by the blacked-in terminals, and seven binary-coded parallel outputs comprising the seven lines of cable 57. The matrix comprises 69 units 114–1 through 114–69 each including a pair of double diodes and two units 95–25 and 95–26, also each comprising two double diodes. The several outputs of the matrices are each passed through two inverter units and a cathode follower unit in cascade, these units being respectively designated 115–1 through 115–4, 116–1 through 116–4, and 117–1 through 117–4, supplying respectively the 1, 2, 4, 8, 16, 32 and 64 output lines comprising cable 57.

In operation, whenever an input terminal of the conversion unit receives a positive-going signal, the output lines comprising cable 57 are set up in a binary combination representing the number of the jack of portion 113 of control panel 110 (FIG. 7) which is connected to that input terminal. In this manner, the assigned numerical weight value which has been selected by the programing of the control panel to correspond with each sequence count output line or each blank count output line is expressed in binary-coded parallel form, and hence is adapted for introduction into sum accumulation system 52 (FIG. 1).

SUM ACCUMULATION SYSTEM

Figure 9:
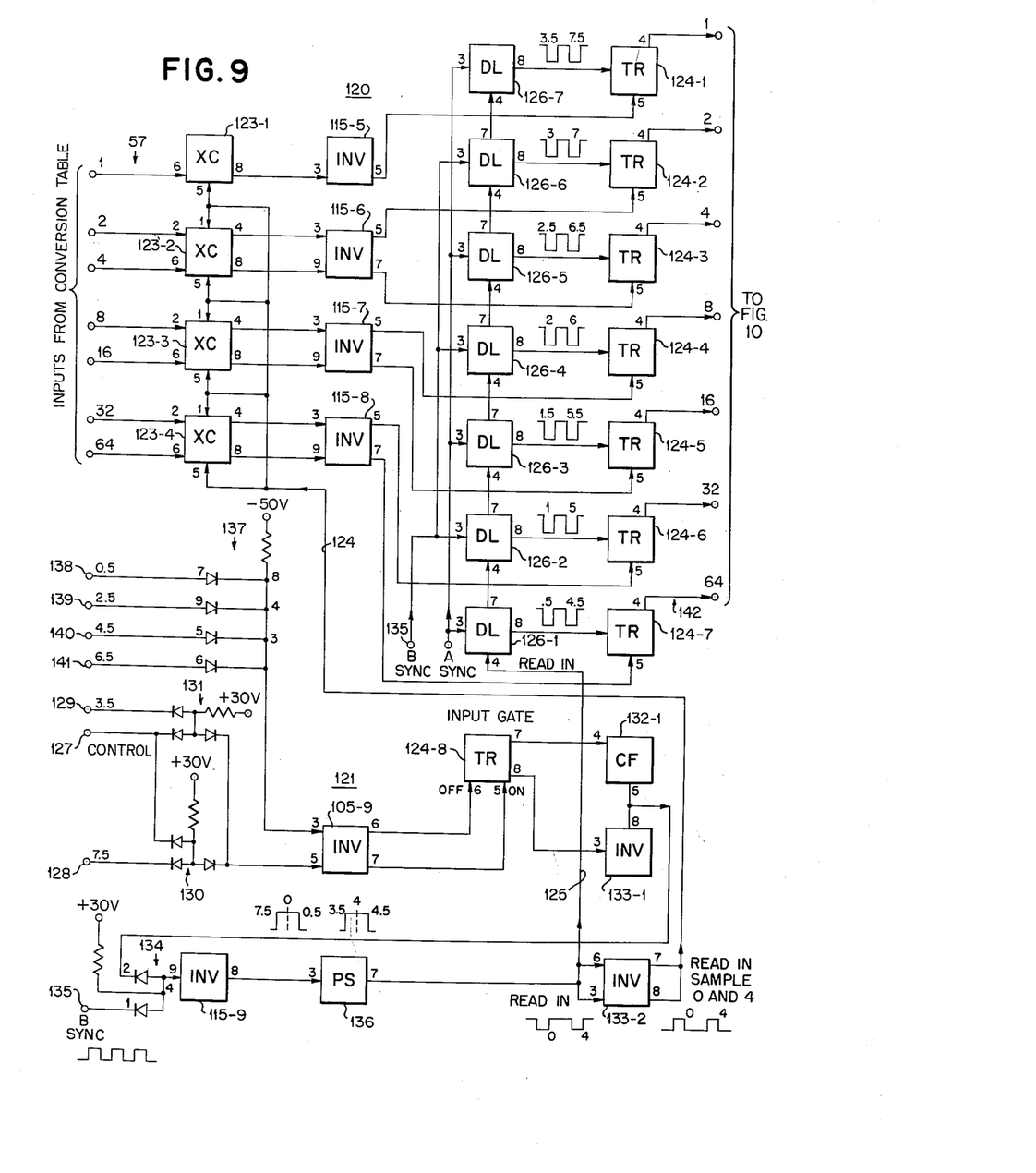
FIGS. 9 and 10 together comprise a block diagram of the sum accumulation system of FIG. 1.
Figure 10:
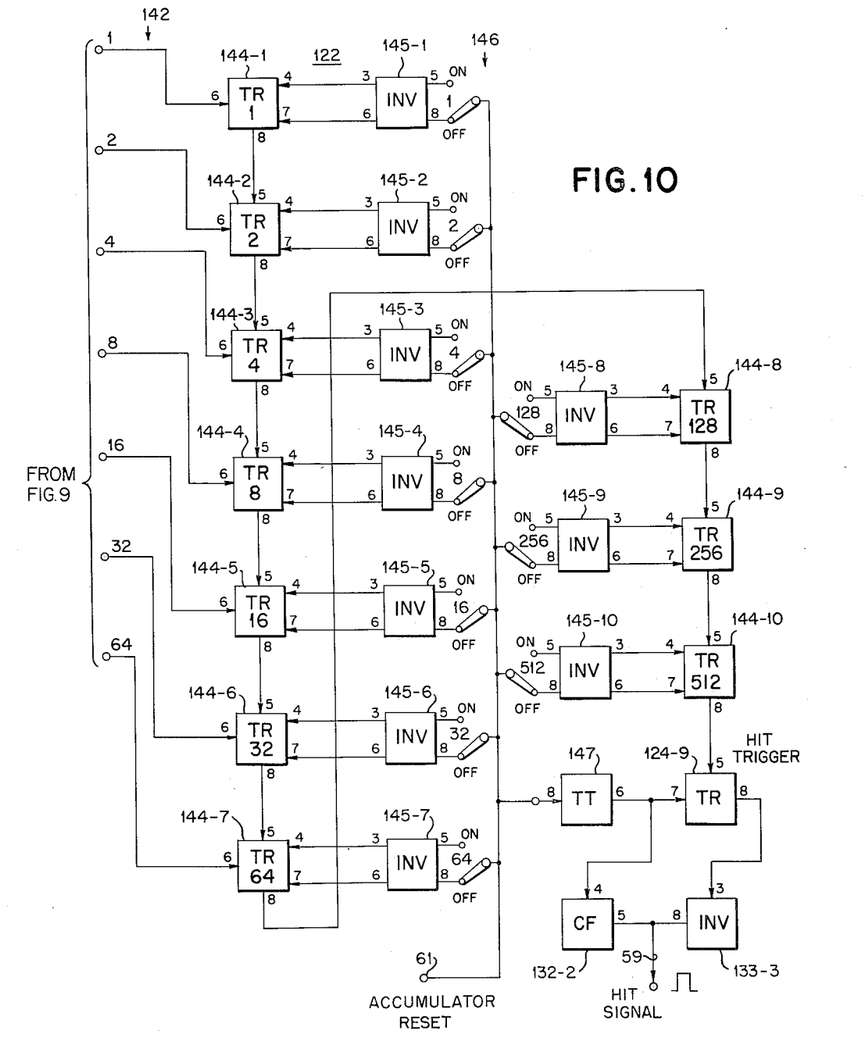

FIGS. 9 and 10, when arranged consecutively from left to right and connected together as indicated, comprise a circuit diagram of sum accumulation system 52 of FIG. 1. In accordance with the invention, the sum is actually developed by so-called "side entry" in a binary counter, each stage of which may be operated in binary fashion either by a carry from the preceding stage or by a signal from an external or side entry source. The sum accumulation system comprises a read-in circuit generally designated by reference numeral 120, a read-in control circuit 121, and a binary counter unit 122. Each of these principal portions of the sum accumulation system will now be discussed separately.

The read-in circuit

Read-in circuit 120 is shown in FIG. 9 of the drawings. The input to this circuit comprises the seven lines forming cable 57 from the conversion table of FIG. 8. The number to be entered into the sum accumulation system is developed in parallel binary form on these seven lines, and is sampled by means of diode coincidence switch units 123–1 through 123–4. The latter units are also supplied with a read-in sample signal by means of a line 124 from read-in control circuit 121. For each input line of cable 57 on which a signal is present, a positive-going voltage pulse appears at the output of the corresponding diode coincidence gate unit. These pulses pass through inverter units 115–5 through 115–8 to turn On corresponding storage trigger units 124–1 through 124–7, in which the number is thereby temporarily stored.

At the time the read-in sample signal occurs on line 124, a negative-going voltage pulse developed on a line 125 in read-in control circuit 121 is started down a tapped delay line comprising storage delay units 126–1 through 126–7 connected in cascade. These delay units provide turn-off voltage pulses to each of storage trigger units 124–1 through 124–7 in succession, beginning with the highest order trigger unit (124–7). Each trigger unit which was On provides, upon being turned Off, a signal to operate the corresponding stage of binary counter circuit 122 (FIG. 10) and, in doing so, contributes an amount equal to the binary value of the associated input line of cable 57 to the total already in the binary counter. This provision for turning Off storage trigger units 124–1 through 124–7 from high order to low order in successive time intervals assures that the side entry signals and the carry signals within the counter cannot occur simultaneously on any counter stage. The seven output lines of the storage trigger units, collectively designated 142, serve as the input to binary counter unit 122 of FIG. 10.

Read-in control circuit

Read-in control circuit 121 (FIG. 9) provides the read-in and read-in sample signals required by read-in circuit 120 of the sum accumulation system. These signals are 0 and 4 bit pulses under the control of signals presented to a terminal 127. If a positive-going pulse is applied to this terminal when the 7.5 and 3.5 bit pulses occur respectively at terminals 128 and 129, positive-going 0 bit and 4 bit pulses will be presented to the read-in circuit. If a positive-going signal encompassing only the 7.5 bit or the 3.5 bit pulse is applied to terminal 127, the only pulse to reach the read-in circuit will be a 0 bit or a 4 bit pulse, respectively. In general, the positive-going signals applied to terminal 127 must encompass the half bit pulse immediately preceding the desired 0 bit or 4 bit pulse.

A positive-going signal applied to terminal 127 enables diode coincidence switches 130 and 131, the other inputs of which are connected respectively to terminals 128 and 129. When one or both of the latter terminals is energized, an output pulse is permitted to pass through inverter unit 105-9 to turn On input gate trigger unit 124-8. When this trigger unit is On, it will send a signal through a cathode follower unit 132-1 and an inverter unit 133-1 to enable a switch unit 134, the other input of which comprises B sync pulses applied to a terminal 135. While this switch is enabled, B sync pulses are permitted to reach read-in circuit 120 after they have been inverted by an inverter unit 115-9 and shaped by a pulse shaper unit 136. The resultant pulses are applied directly to line 125, and are passed through inverter unit 133-2 to supply line 124.

An OR circuit 137 has its four inputs connected to terminals 138, 139, 140 and 141, supplied respectively with 0.5, 2.5, 4.5 and 6.5 bit pulses. The output of OR circuit 137 is passed through inverter unit 105-9 and utilized to turn Off input gate trigger unit 124-8. In this manner, only one B sync pulse will be able to pass through read-in control circuit 121 at a time, because input gate trigger unit 124-8 is turned Off by the following inverted 0.5 or 4.5 bit pulse.

*Binary counter unit*

Referring to FIG. 10, the input to binary counter unit 122 comprises the seven lines collectively designated 142, each line having associated with it a trigger unit, the seven trigger units being respectively designated 144-1 through 144-7. These trigger units are connected in cascade with additional trigger units 144-8 through 144-10 to form a binary counter. Inverter units 145-1 through 145-10 are associated respectively with trigger units 144-1 through 144-10, and each inverter unit in turn has associated with it a switch diagramatically represented as a SPDT switch, these switches being collectively designated by reference numeral 146 and having their blade terminals connected together and to accumulator reset terminal 61.

If initially all stages of the binary counter are Off, then after each accumulator entry the counter will contain, in binary form, the true sum of all the entries. A carry from the last or highest order stage of the counter, represented by trigger unit 144-10, would be an indication that the capacity of the accumulator had been exceeded. This carry signal serves to turn On a trigger unit 124-9, thus providing a pulse which is passed through an inverter unit 133-3 to provide an output signal on output line 59. Such a condition is realized when all of switches 146 are in their Off positions at the time an accumulator reset pulse is applied to terminal 61. By means of a twin triode unit 147, the next reset pulse on terminal 61 also serves to reset trigger unit 124-9.

If the counter is initially reset to some predetermined number, by suitable actuation of selected ones of switches 146 before the application of the reset pulse to terminal 61, then the total which must be added to cause a carry from the last stage may be considered a "threshold," and the total in the counter after the threshold is passed will be an "excess over threshold." As an example, consider that the counter of FIG. 10, having capacity of 1024, is reset to 833. The binary equivalent of 833 is 1101000001, so that the stages corresponding to the numbers 512, 256, 64 and 1 would be On. The binary number 10111111 or 191, when added to this will produce a carry from the last stage and leave all stages Off. Thus if the counter is reset to 833, 191 (=1024−833) constitutes the "threshold," and any entry made after the threshold of 191 is once reached will contribute to an "excess over threshold" or "excess over 191" in the counter.

The accumulated sum may be read out of binary counter unit 122 by conventional means (not shown). For example, the ten-line cable 58 (FIG. 1) may have each of its lines associated with one of trigger units 144-1 through 144-10, so that a signal is developed on the corresponding line whenever the trigger unit is On. It will also be understood that additional binary counters may be provided, with a suitable arrangement for selecting the desired unit, without departing from the scope of the present invention.

THE BASIC CIRCUIT COMPONENTS

For convenience, the basic circuit components, some of which are used in several different places in the system as a whole, are shown individually in FIGS. 11–38. The following table indicates the reference numeral assigned to each of these basic circuit components and the figure or figures in which each of them is employed. Reference to this table, taken with the brief description of the basic circuit components immediately following, will provide the information necessary for a complete understanding of the previous figures of the drawings.

*Basic circuit components*

| Figure No. | Reference Numeral | Used In Figs |
|---|---|---|
| 11 | 80 | 3, 4 |
| 14 | 81 | 3, 4 |
| 12 | 82 | 3, 4 |
| 17 | 83 | 3, 4, 6 |
| 15 | 84 | 3, 4 |
| 16 | 85 | 3, 4, 8 |
| 18 | 86 | 3, 4, 6 |
| 13 | 90 | 3 |
| 20 | 94 | 5 |
| 19 | 95 | 5, 8 |
| 22 | 102 | 5 |
| 21 | 103 | 5 |
| 23 | 105 | 6, 9 |
| 23 | 106 | 6 |
| 24 | 107 | 6 |
| 25 | 114 | 8 |
| 29 | 115 | 8 |
| 27 | 116 | 8 |
| 26 | 117 | 8 |
| 35 | 123 | 9 |
| 31 | 124 | 9 |
| 33 | 126 | 9 |
| 30 | 132 | 9, 10 |
| 34 | 133 | 9 |
| 32 | 136 | 9 |
| 37 | 144 | 10 |
| 38 | 145 | 10 |
| 36 | 147 | 10 |

Figure 11:
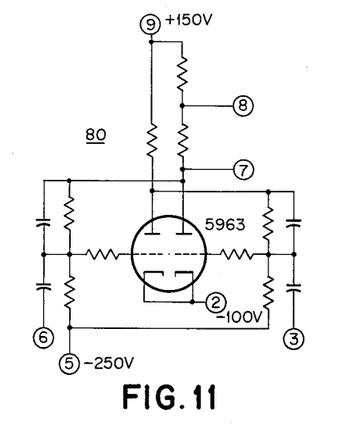
FIGS. 11–38 are schematic circuit diagrams of various components illustrated in block form in one or more of the preceding figures.
Figure 12:
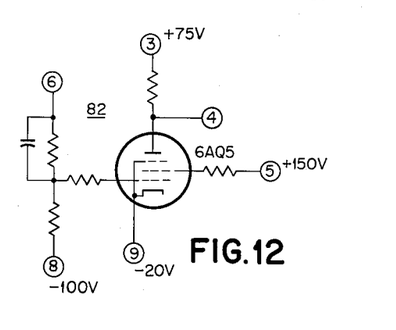

Trigger unit 80 of FIG. 11 is a low-speed trigger unit with the full and tap outputs taken from the same side of the trigger. The output is a 100-volt signal (+50 to −50 volts) when the usual voltages and signals are applied to the unit. Diode triode unit 81 of FIG. 14 contains a dual triode and a dual vacuum diode. The plates of the diodes are tied respectively to the grids of the triodes through 100,000-ohm resistors. Power inverter unit 82 of FIG. 12 employs a type 6AQ5 vacuum tube and is adapted to meet the higher power requirements of matrix drive and relay pickup circuits. The operating signal is +30 to −20 volts, and the output signal is +25 to +75 volts.

Figure 17:
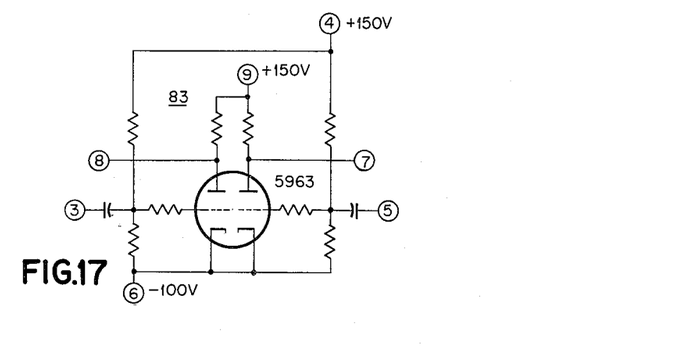

Inverter unit 83 of FIG. 17 contains two normally conducting vacuum tube portions. The input is through a large capacitor providing a long time constant. A 30-volt negative pulse is required to cut the inverter off and to produce an output swing of approximately 200 volts. Twin triode unit 84 of FIG. 15 comprises merely a type 6953 tube with 47,000-ohm grid resistors. Unit 85 of FIG. 16 comprises eight 39,000-ohm resistors, which are normally used as plate loads and may be combined in many series-parallel combinations to obtain the desired values of resistance.

Figure 18:
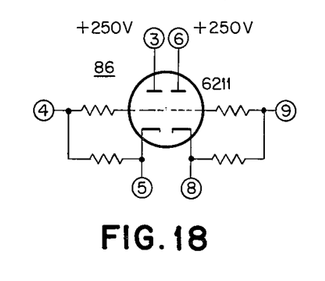
Figure 19:
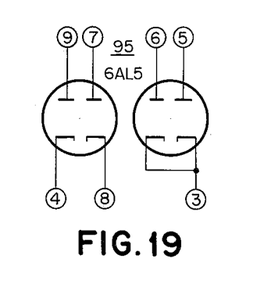

Twin triode unit 86 of FIG. 18 is especially adapted for gating the plates of other tubes, this being accomplished by connecting these plates to the cathodes of the twin triode unit. The purpose of the resistors connected between the cathodes and grids is to speed up the pulling down of the gated plates.

Figure 13:
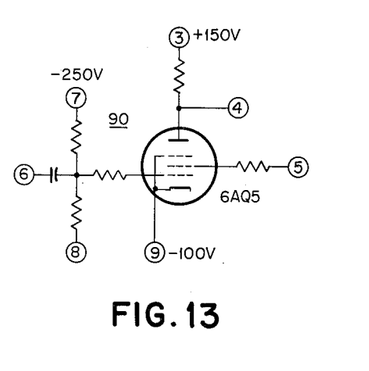
Figure 14:
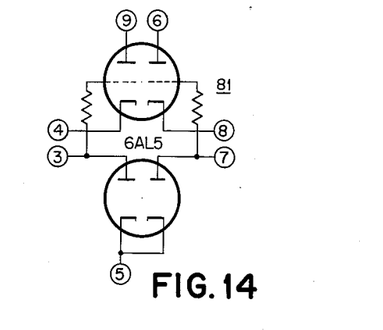
Figure 15:
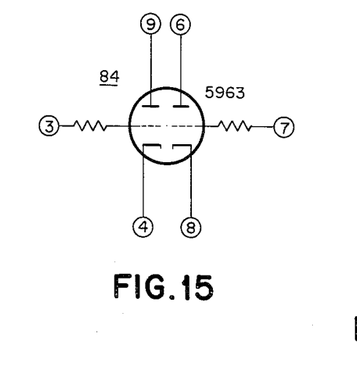
Figure 16:
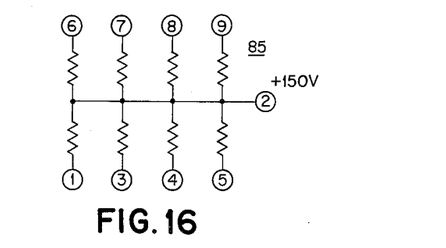
Figure 20:
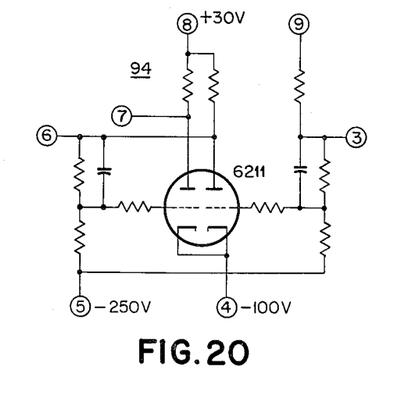
Figure 21:
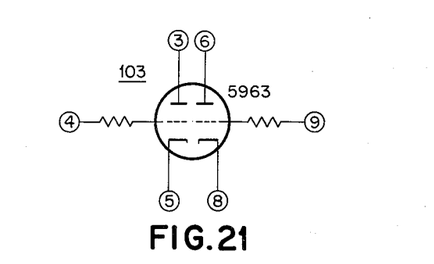

Inverter unit 90 of FIG. 13 employs a type 6AQ5 tube and is adapted for furnishing relatively high power outputs. Double inverter unit 94 of FIG. 20 is especially adapted for use where bi-polar lines are required, as for example in a matrix entry. The two outputs are opposite in phase, that is, while one of the outputs is up the other is down, and vice versa. A 100-volt signal is required at terminal 3 to operate the unit. Vacuum diode unit 95 of FIG. 19 comprises a pair of type 6AL5 tubes, the cathodes of one of the tubes being connected together.

Figure 22:
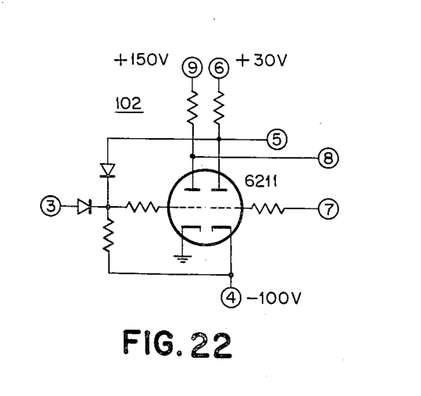
Figure 23:
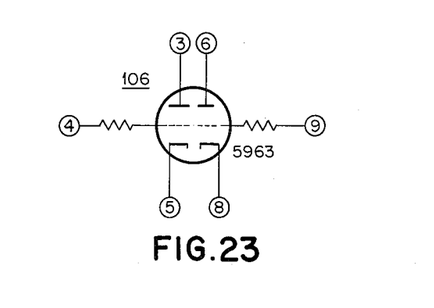
Figure 24:
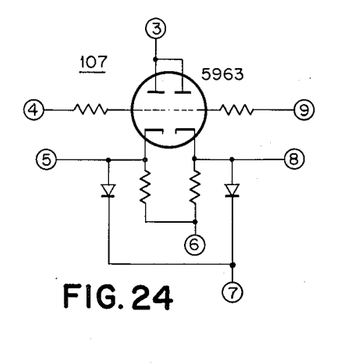
Figure 25:
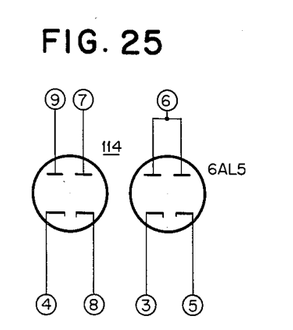

In pulse forming unit 102 of FIG. 22 positive-going pulses applied to input terminal 3 are formed into pulses of a duration determined by the RC network externally placed between terminals 7 and 8. These pulses will be emitted from terminal 5. Unit 103 of FIG. 21 comprises merely a type 5963 twin triode tube. Inverter unit 105 of FIG. 28 comprises two independent low-to-high inverters. Unit 106 of FIG. 23 comprises a type 5963 twin triode, and differs from twin triode unit 103 of FIG. 21 only in the value of the grid resistors, these resistors having a value of 47 ohms in unit 103 and a value of 470 ohms in unit 106. Cathode follower unit 107 of FIG. 24 provides an output which is clamped to a desired level by means of crystal diodes connected to terminal 7. Vacuum diode unit 114 of FIG. 25 comprises two type 6AL5 tubes arranged to furnish four diode sections. The plates of one of the diodes are connected together and brought out to terminal 6.

Figure 27:
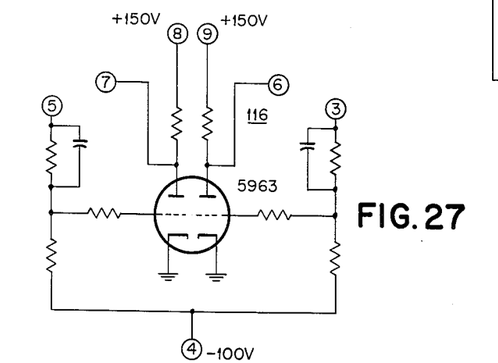
Figure 28:
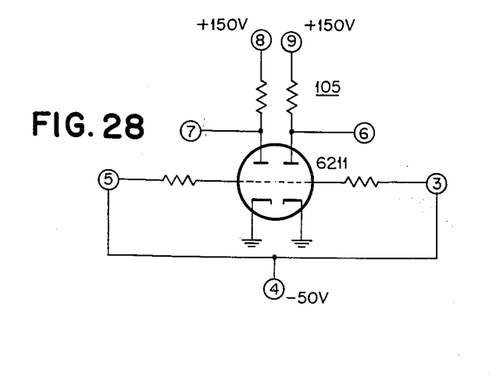
Figure 29:
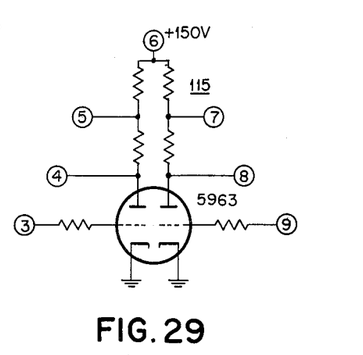

Inverter unit 115 of FIG. 29 is a dual low-to-high inverter with direct inputs and both full and tapped outputs. The two inverters are independent, but receive their plate voltage from a common terminal. Inverter unit 116 of FIG. 27 is of the dual high-to-high type with independent inverters, each of which utilizes one section of a type 5963 twin triode. Each input circuit comprises a compensated divider network.

Figure 26:
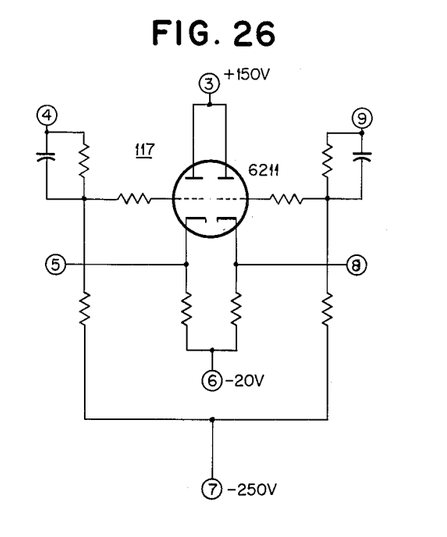
Figure 31:
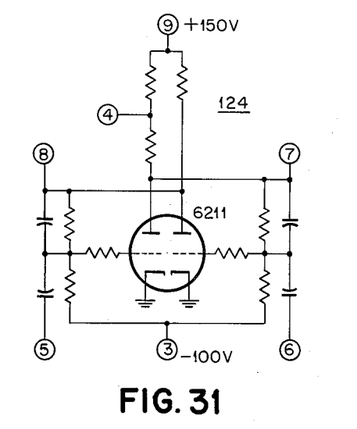

Cathode follower unit 117 of FIG. 26 is a dual device with a common plate connection but individual input and output connections. The input is a high-level (+150 to +50 volt) and the output is a low-level (+30 to −20 volt) signal. Positive coincidence diode unit 123 of FIG. 35 contains two triple coincidence diode switches. When a positive signal is placed on inputs 1, 2 and 3, or inputs 5, 6 and 7 simultaneously, an output will be obtained at terminals 4 and 8 respectively. This unit may also be used to mix negative signals presented to inputs 1, 2 or 3 or inputs 5, 6 or 7. The outputs of the mixed signals in this case will also appear respectively at terminals 4 and 8. Trigger unit 124 of FIG. 31 is a general purpose medium-speed trigger circuit which is adapted for operating speeds up to 200 kilopulses per second. The inputs (terminals 5 and 6) may be tied together for binary operation. There are two full outputs (terminals 7 and 8) and one tapped output appearing at terminal 4.

Figure 33:
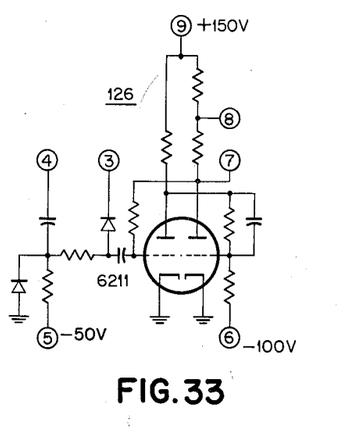
Figure 34:
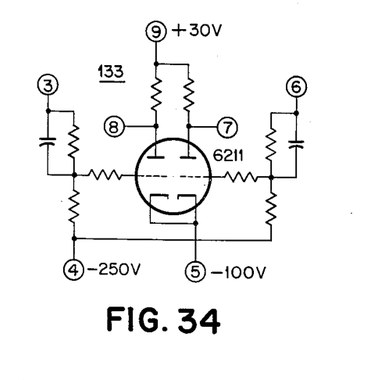
Figure 35:
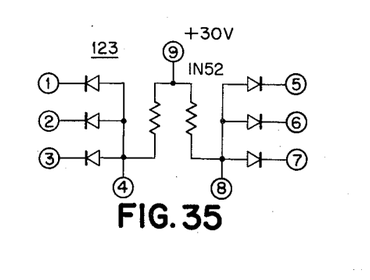
Figure 36:
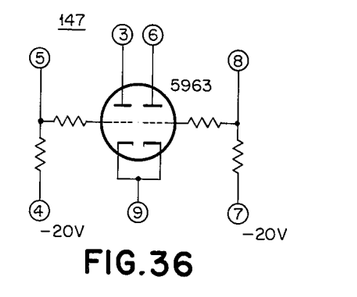

Delay unit 126 of FIG. 33 receives pulse information, delays it until the following synchronizing pulse occurs, and then shapes it to provide an output pulse at terminal 7. The input pulse presented at input terminal 2 is a negative-going 100-volt pulse. The synchronizing pulses applied to terminal 3 are negative-going (+30 to 0 volts). The circuit constants are selected for optimum performance at a synchronizing pulse repetition rate of 100 kilopulses per second with each of the pulses approximately 2½ microseconds wide. The trailing edge of the input pulse must either coincide with or occur slightly after the trailing edge of the synchronizing pulse.

Figure 30:
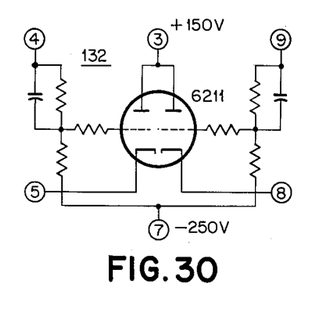

Cathode follower unit 132 of FIG. 30 is a double unit having a common plate connection and separate inputs and outputs to the two portions. The cathode load resistors are external to this unit, being connected respectively to terminals 5 and 8. Inverter unit 133 of FIG. 34 contains two high-to-low inverters each having a compensated divider input circuit.

Figure 32:
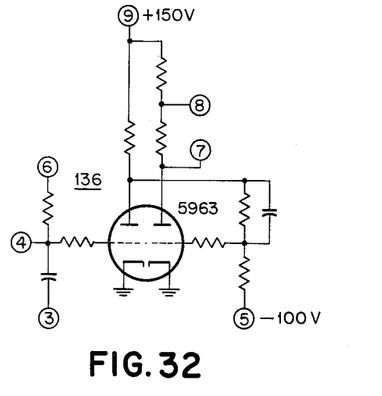
Figure 37:
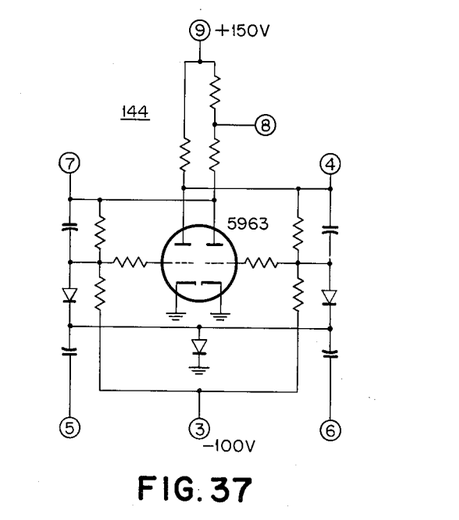

Pulse former unit 136 of FIG. 32 has a capacitive input at terminal 3. The output pulse developed at terminal 7 may be varied in length to one, two or three microseconds by connecting terminal 6 to terminal 9, terminal 8 or terminal 7, respectively. A 100-volt input pulse is required, and a 100-volt input pulse will be emitted at terminal 7. Trigger unit 144 of FIG. 37 is of the high-speed type, and is capable of operation up to 300 kilocycles per second. This unit has one tapped and two full outputs, available at terminals 8, 7 and 4, respectively. A negative input pulse of 40 to 50 volts is required to operate the trigger unit. An internal connection is provided which permits the trigger unit to be operated in a binary manner.

Figure 38:
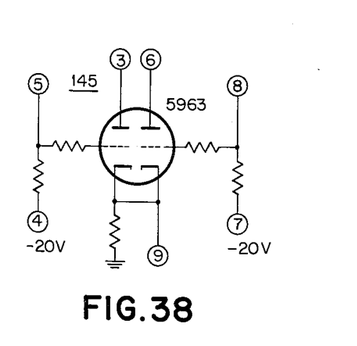

Inverter unit 145 of FIG. 38 comprises a trigger reset device with no plate resistors. The unit contains a degenerative cathode resistor to control the reset signal. Twin triode unit 147 of FIG. 36 comprises a type 5963 tube having each of its grids connected to suitable dividing networks. It is especially adapted for use in trigger reset applications.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a system for analyzing a sequence of input signals, the combination of: a plurality of input lines to which input signals are applied one at a time, a plurality of sequence count output lines, counting means associated with each said input line and adapted to signal the one of said sequence count output lines corresponding to the total count of signals on said input line, means for accumulating values corresponding to said signalled sequence count output lines to provide a sum output, and means for providing an output signal whenever said sum output exceeds a predetermined value.

2. In a system for analyzing a sequence of input signals, the combination of: a plurality of sequence input lines to which input signals are applied one at a time, a blank input line to which input signals are applied whenever none of said sequence input lines is signalled, a plurality of sequence count output lines and a plurality of blank count output lines, counting means associated with each said sequence input line and adapted to signal the one of said sequence count output lines corresponding to the total count of signals on said sequence input line, counting means associated with said blank input line and adapted to signal the one of said blank count output lines corresponding to the total count of signals on said blank input line, and means for accumulating values corresponding to said signalled sequence count output lines and said blank count output lines to provide a sum output.

3. In a system for analyzing a sequence of input signals, the combination of: a plurality of sequence input lines to which input signals are applied one at a time, a blank input line to which input signals are applied whenever none of said sequence input lines is signalled, a plurality of sequence count output lines and a plurality of blank count output lines, counting means associated with each said sequence input line and adapted to signal the one of said sequence count output lines corresponding to the total count of signals on said sequence input line, counting means associated with said blank input line and adapted to signal the one of said blank count output lines corresponding to the total count of signals on said blank input line, means for accumulating values corresponding to said signalled sequence count output lines and said blank count output lines to provide a sum output, and means for providing an output signal whenever said sum output exceeds a predetermined value.

4. In a system for analyzing a sequence of input signals, the combination of: a plurality of input lines to which input signals are applied one at a time, a plurality of sequence count output lines, counting means associated with each said input line and adapted to signal the one of said sequence count output lines corresponding to the total count of signals on said input line, means for assigning a numerical weight value to each said sequence count output line, means for accumulating said weight values to provide a sum output, and means for providing an output signal whenever said sum output exceeds a predetermined value.

5. In a system for analyzing a sequence of input signals, the combination of: a plurality of sequence input lines to which input signals are applied one at a time, a blank input line to which input signals are applied whenever none of said sequence input lines is signalled, a plurality of sequence count output lines and a plurality of blank count output lines, counting means associated with each said sequence input line and adapted to signal the one of said sequence count output lines corresponding to the total count of signals on said sequence input line, counting means associated with said blank input line and adapted to signal the one of said blank count output lines corresponding to the total count of signals on said blank input line, means for assigning a numerical weight value to each said sequence count output line and to each said blank count output line, and means for accumulating said weight values to provide a sum output.

6. In a system for analyzing a sequence of input signals, the combination of: a plurality of sequence input lines to which input signals are applied one at a time, a blank input line to which input signals are applied whenever none of said sequence input lines is signalled, a plurality of sequence count output lines and a plurality of blank count output lines, counting means associated with each said sequence input line and adapted to signal the one of said sequence count output lines corresponding to the total count of signals on said sequence input line, counting means associated with said blank input line and adapted to signal the one of said blank count output lines corresponding to the total count of signals on said blank input line, means for assigning a numerical weight value to each said sequence count output line and to each said blank count output line, means for accumulating said weight values to provide a sum output, and means for providing an output signal whenever said sum output exceeds a predetermined value.

References Cited in the file of this patent

UNITED STATES PATENTS

| | | |
|---|---|---|
| 2,616,983 | Zworyking | Nov. 4, 1952 |
| 2,634,052 | Bloch | Apr. 7, 1953 |
| 2,674,727 | Spielberg | Apr. 6, 1954 |